United States Patent
Takatsuka et al.

(10) Patent No.: US 10,946,750 B2
(45) Date of Patent: Mar. 16, 2021

(54) CHARGE/DISCHARGE CONTROL DEVICE, CHARGE/DISCHARGE CONTROL SYSTEM, AND CHARGE/DISCHARGE CONTROL METHOD

(71) Applicant: OMRON CORPORATION, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 289 days.

(21) Appl. No.: 15/758,172

(22) PCT Filed: Nov. 2, 2016

(86) PCT No.: PCT/JP2016/082597
§ 371 (c)(1),
(2) Date: Mar. 7, 2018

(87) PCT Pub. No.: WO2017/086165
PCT Pub. Date: May 26, 2017

(65) Prior Publication Data
US 2018/0248388 A1  Aug. 30, 2018

(30) Foreign Application Priority Data
Nov. 17, 2015  (JP) .............................. JP2015-224440

(51) Int. Cl.
*H02J 7/00* (2006.01)
*H02J 7/34* (2006.01)
(Continued)

(52) U.S. Cl.
CPC ............... *B60L 50/60* (2019.02); *B60L 53/80* (2019.02); *B60L 58/12* (2019.02); *B60L 58/14* (2019.02);
(Continued)

(58) Field of Classification Search
CPC ....................................................... H02J 7/00
See application file for complete search history.

(56) References Cited

U.S. PATENT DOCUMENTS 6,741,065 B1  5/2004  Ishii et al.
2002/0140397 A1  10/2002  Hasegawa et al.
(Continued)

FOREIGN PATENT DOCUMENTS

EP  1391950 A1  2/2004
EP  2144314 A2  1/2010
(Continued)

OTHER PUBLICATIONS

Japanese office action letter dated Nov. 26, 2019 in a counterpart Japanese patent application.
(Continued)

*Primary Examiner* — Robert Grant
(74) *Attorney, Agent, or Firm* — Metrolex IP Law Group, PLLC (57) ABSTRACT

A charge and discharge control device (30) is a charge and discharge control device that controls the charging and discharging of a plurality of capacitors configured to be removably connected in parallel to a vehicle (20), the charge and discharge control device (30) device comprising a required power input component (31), a receiver (32), and a priority setting component (39). The required power input component (31) is configured to be inputted a request for power to be supplied to a motor (21) of the vehicle (20). The receiver (32) is configured to acquire remaining capacity of
(Continued)

each of the capacitors (11). The priority setting component (39) is configured to set the priority of use of a plurality of capacitors (11A 11B, 11C, and 11D) when supplying the power inputted to the required power input component (31) on the basis of the remaining capacity acquired by the receiver (32).

15 Claims, 6 Drawing Sheets

(51) Int. Cl.
  *B60L 50/60* (2019.01)
  *B60L 58/12* (2019.01)
  *B60L 53/80* (2019.01)
  *B60L 58/14* (2019.01)
  *B60L 58/22* (2019.01)
  *B62M 6/90* (2010.01)

(52) U.S. Cl.
  CPC .............. *B60L 58/22* (2019.02); *B62M 6/90* (2013.01); *H02J 7/00* (2013.01); *H02J 7/0021* (2013.01); *B60L 2200/12* (2013.01); *B60L 2260/54* (2013.01); *H02J 7/345* (2013.01); *Y02T 10/70* (2013.01)

(56) References Cited

U.S. PATENT DOCUMENTS

| | | |
|---|---|---|
| 2009/0315359 A1 | 12/2009 | Suzuki et al. |
| 2010/0241301 A1 | 9/2010 | Yang |
| 2010/0261043 A1 | 10/2010 | Kim et al. |
| 2012/0319493 A1 | 12/2012 | Kim et al. |
| 2013/0026828 A1 | 1/2013 | Iwami |
| 2013/0229152 A1 | 9/2013 | Kurimoto |
| 2014/0167657 A1* | 6/2014 | Nishikawa .............. B60L 50/51 318/139 |
| 2015/0002102 A1* | 1/2015 | Ohashi ................ H01M 10/441 320/135 |
| 2015/0123611 A1 | 5/2015 | Huang |
| 2015/0258911 A1 | 9/2015 | Sugiyama |
| 2015/0298565 A1 | 10/2015 | Iwamura et al. |

FOREIGN PATENT DOCUMENTS

| | | |
|---|---|---|
| EP | 2555372 A1 | 2/2013 |
| EP | 2738908 A1 | 6/2014 |
| EP | 2894436 A1 | 7/2015 |
| JP | S63-133839 A | 6/1988 |
| JP | H9-163506 A | 6/1997 |
| JP | 2001-45673 A | 2/2001 |
| JP | 2002-305843 A | 10/2002 |
| JP | 2005-237064 A | 9/2005 |
| JP | 2010-4666 A | 1/2010 |
| JP | 2010-71736 A | 4/2010 |
| JP | 2010-178514 A | 8/2010 |
| JP | 2010-183785 A | 8/2010 |
| JP | 2012-113856 A | 6/2012 |
| JP | 2012-523670 A | 10/2012 |
| JP | 2013-183561 A | 9/2013 |
| JP | 2013-192327 A | 9/2013 |
| JP | 2014-121180 A | 6/2014 |
| JP | 2014-166846 A | 9/2014 |
| WO | 02/086993 A1 | 10/2002 |
| WO | 2013/014930 A1 | 1/2013 |
| WO | 2013108246 A2 | 7/2013 |
| WO | 2014/115015 A1 | 7/2014 |
| WO | 2017/086164 A1 | 5/2017 |

OTHER PUBLICATIONS

English translation of the International Search Report of a related international application PCT/JP2016/082596 dated Jan. 24, 2017.
English translation of the Written Opinion of a related international application PCT/JP2016/082596 dated Jan. 24, 2017.
English translation of the International Search Report of PCT/JP2016/082597 dated Dec. 27, 2016.
English translation of the Written Opinion of PCT/JP2016/082597 dated Dec. 27, 2016.
Extended European search report ("EESR") dated Apr. 29, 2019 in a counterpart European patent application.
Extended European search report (EESR) dated Nov. 27, 2018 in a related European patent application.
Office Action dated May 26, 2020 in the counterpart Japanese patent application.

* cited by examiner

CHARGE/DISCHARGE CONTROL DEVICE, CHARGE/DISCHARGE CONTROL SYSTEM, AND CHARGE/DISCHARGE CONTROL METHOD

FIELD

The present invention relates to a charge and discharge control device, a charge and discharge control system, and a charge and discharge control method for controlling the charging and discharging of batteries.

BACKGROUND

Vehicles equipped with a plurality of batteries that can be connected in parallel have been proposed in the past (see Patent Literature 1, for example).

The vehicle in Patent Literature 1 is configured so that a plurality of batteries can be disposed spaced apart in the width direction of the vehicle. The user then removes or adds batteries according to the distance to be traveled.

Meanwhile, recent years have seen systems constructed in which batteries installed in a vehicle such as an electric motorcycle or an electric bicycle are used and then exchanged at a station where charged batteries are available.

CITATION LIST

Patent Literature

Patent Literature 1: JP-A 2010-4666

SUMMARY

However, the following problems may be encountered when using a plurality of batteries that can be connected in parallel as in Patent Literature 1.

Figure 7:
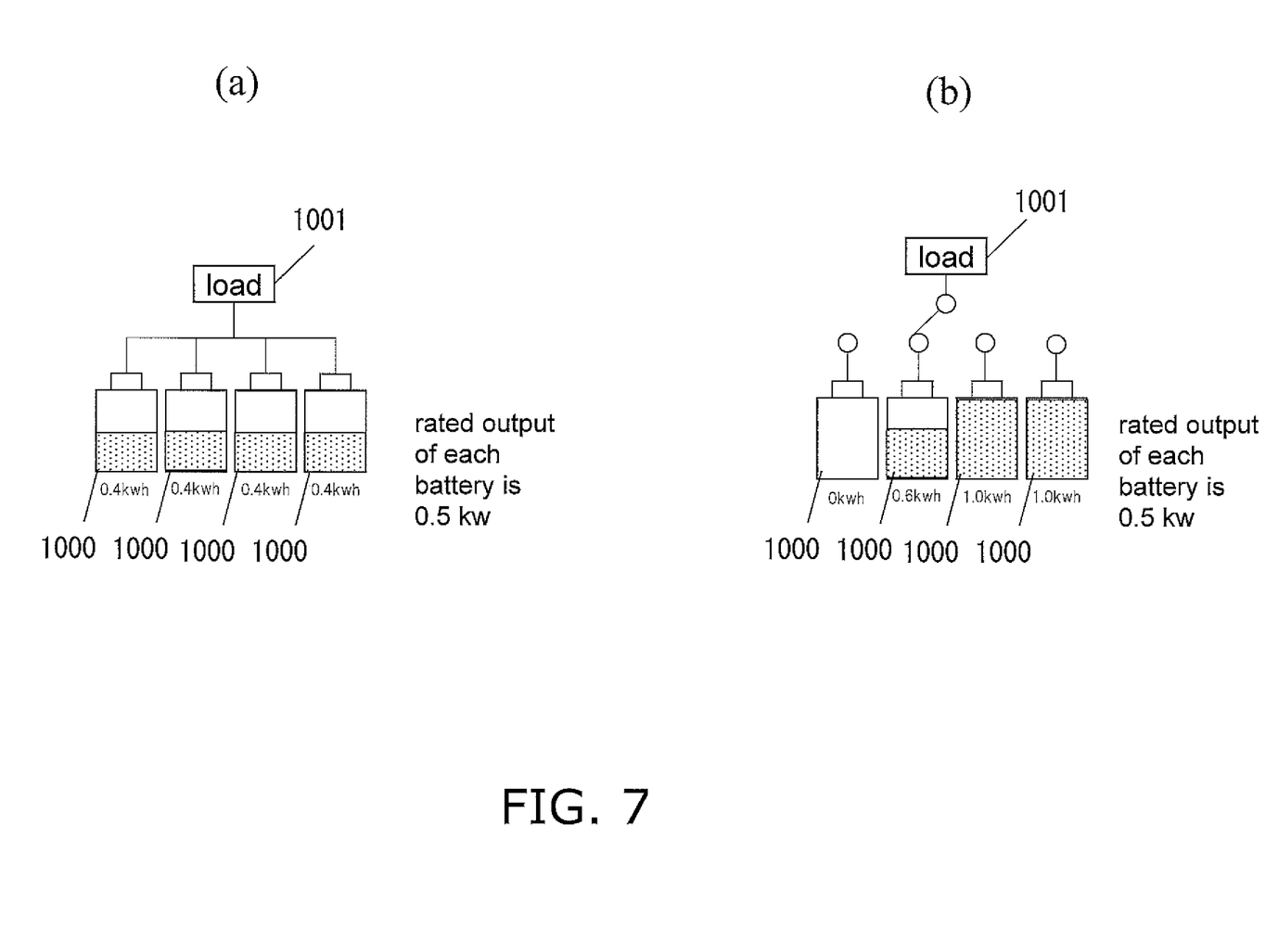
FIGS. 7a and 7b are diagrams of the conventional electrical connection relation between a load and a plurality of batteries.

Specifically, with a vehicle equipped with a plurality of batteries 1000 connected in parallel to a load 1001 (such as a motor), as shown in FIG. 7*a*, the capacity usually decreases evenly in proportion to the distance traveled (in FIG. 7*a*, the remaining capacity is 0.4 kwh). Therefore, all of the batteries have to be exchanged at the station, which can entail considerable work.

Meanwhile, in order to reduce the number of batteries that are exchanged at a station, it is also conceivable that the batteries 1000 can be connected to the load 1001 one by one and in order as shown in FIG. 7*b*. With this configuration, if the rated output of each battery 1000 is 0.5 kw, for example, since only one battery 1000 can be connected to the load 1001 at a time, when there is a demand for power greater than 0.5 kw, such as during hard acceleration, that demand cannot be met.

It is an object of the present invention to provide a charge and discharge control device, a charge and discharge control system, and a charge and discharge control method with which the remaining capacity of batteries can be adjusted to reduce the amount of work entailed by battery replacement, and with which user power demands can be met.

Solution to Problem

The charge and discharge control device pertaining to the first invention is a charge and discharge control device that controls the charging and discharging of a plurality of batteries that can be removably connected in parallel to a power consumption element, said device comprising a required power input component, a remaining capacity acquisition component, and a priority setting component. The required power input component inputs a request for power to be supplied to the drive source of the power consumption element. The remaining capacity acquisition component acquires the remaining capacity of each of the batteries. The priority setting component sets the priority of use of the plurality of batteries when supplying the power inputted to the required power input component on the basis of the remaining capacity acquired by the remaining capacity acquisition component.

The number of batteries used out of the plurality of batteries will vary with the amount of the power that is requested, but by preferentially using specific batteries, a distribution can be provided in the remaining capacity of the batteries, rather than using them evenly. That is, the remaining capacity of batteries used preferentially can be reduced, and the remaining capacity of the other batteries can be increased. Therefore, by replacing batteries with a low remaining capacity, rather than replacing all the batteries, it is possible to efficiently increase the overall remaining capacity of the batteries installed in the power consumption element. Because the overall remaining capacity of the batteries installed in the power consumption element can be increased with few replacements, battery exchange entails less work.

Also, when the remaining capacity of batteries used preferentially decreases, the other batteries can be used preferentially, which prevents the remaining capacity of the batteries from dropping to zero or the discharge lower limit value. Therefore, even when the maximum output based on the number of batteries is requested, the rated output can be supplied from all the batteries, so the user's power demands can be met.

As described above, it is possible to adjust the remaining capacity of the batteries so as to reduce the work entailed by battery replacement at a station, and the user's power demands can be met.

Examples of power consumption elements include vehicles such as electric motorcycles, electric bicycles, electrically assisted bicycles, electric unicycles, electric automobiles (EVs), and PHVs (plug-in hybrid vehicles). Power consumption elements also encompass electric power tools such as electric drills.

The charge and discharge control device pertaining to the second invention is the charge and discharge control device pertaining to the first invention, further comprising a battery use decision component and a connection relation decision component. The battery use decision component decides on one or more batteries to use out of the plurality of batteries, on the basis of the priority set by the priority setting component and the power inputted to the required power input component. The connection relation decision component decides on the electrical connection relation between the plurality of batteries and the drive source of the power consumption element so as to supply power from the batteries decided to be used by the battery use decision component to the drive source.

Thus setting the electrical connection relation allows specific batteries to be used preferentially even if the requested power changes.

The charge and discharge control device pertaining to the third invention is the charge and discharge control device pertaining to the first invention, wherein the priority setting component sets the priority of the plurality of batteries in the order set by the user.

This allows the batteries to be used in the order set by the user.

The charge and discharge control device pertaining to the fourth invention is the charge and discharge control device pertaining to the first invention, wherein the priority setting component sets the priority of the plurality of batteries based on the number of uses.

This allows the batteries to be used in ascending order of use count or in descending order of use count.

The charge and discharge control device pertaining to the fifth invention is the charge and discharge control device pertaining to the first invention, wherein, when the remaining capacity of a battery whose priority is high is presumed to have reached a first threshold on the basis of the remaining capacity acquired by the remaining capacity acquisition component, the priority setting component lowers the priority of that battery and raises the priority of the other battery.

Consequently, when the remaining capacity of batteries used preferentially reaches the first threshold value, the remaining capacity of those batteries can be kept at the first threshold by preferentially using other battery.

Therefore, even when the maximum output based on the number of batteries is requested, the rated output can be supplied from all the batteries.

The charge and discharge control device pertaining to the sixth invention is the charge and discharge control device pertaining to the fifth invention, wherein the priority setting component makes it impossible to use any of the plurality of batteries whose remaining capacity is at or under a second threshold that is below the first threshold.

This prevents the use of batteries whose remaining capacity is at or below the second threshold.

The charge and discharge control device pertaining to the seventh invention is the charge and discharge control device pertaining to the fifth invention, wherein the priority setting component sets the priority so that the plurality of batteries reach the first threshold one by one and in order.

Thus controlling the plurality of batteries to reach the first threshold value one by one and in order allows a battery whose remaining capacity has reached the first threshold value or a battery whose remaining capacity is close to the first threshold value to be replaced at the station, thereby efficiently increasing the overall remaining capacity of the batteries in a power consumption element.

The charge and discharge control device pertaining to the eighth invention is the charge and discharge control device pertaining to any of the fifth to seventh inventions, wherein the first threshold is the remaining capacity at which the rated power of the batteries can be supplied.

This allows the rated power to be outputted from batteries whose remaining capacity has reached the first threshold value.

The charge and discharge control device pertaining to the ninth invention is the charge and discharge control device pertaining to the second invention, wherein, when the remaining capacity of battery whose priority is high is presumed to have reached a first threshold on the basis of the remaining capacity acquired by the remaining capacity acquisition component, the priority setting component lowers the priority of those batteries and raises the priority of the other battery. When the remaining capacity of the batteries has reached a second threshold that is below the first threshold, the connection relation decision component decides on the electrical connection relation so that power will be supplied from the other battery whose remaining capacity is above the first threshold, to the batteries whose remaining capacity has reached the second threshold.

Thus, when the remaining capacity of a battery reaches the second threshold value, that battery is supplemented with power from other battery. By setting the second threshold value to the lower limit value at which the rated output can be ensured, for example, the rated output from each battery can be guaranteed.

Also, setting the second threshold value to the discharge lower limit value helps avoid deterioration of the batteries, for example.

The charge and discharge control device pertaining to the tenth invention is the charge and discharge control device pertaining to the ninth invention, wherein the connection relation decision component decides on the electrical connection relation so that power is supplied from the other battery until the remaining capacity of the battery whose remaining capacity has reached the second threshold reaches the first threshold.

Thus, when the remaining capacity of a battery reaches the second threshold value, power is supplemented from other battery until the remaining capacity of that battery reaches the first threshold value. This makes it possible to meet the user's requested output for as long as possible.

The charge and discharge control device pertaining to the eleventh invention is the charge and discharge control device pertaining to the second invention, further comprising a display controller. When the remaining capacity of a battery whose priority is high is presumed to have reached a first threshold on the basis of the remaining capacity acquired by the remaining capacity acquisition component, the priority setting component lowers the priority of that battery and raises the priority of the other battery. The priority setting component makes it impossible to use any of the plurality of batteries whose remaining capacity is at or under a second threshold that is below the first threshold. The display controller causes a display component of the power consumption element to display a notification to the effect that the requested power cannot be supplied, when the requested power cannot be supplied unless the unusable batteries are used, when the battery use decision component decides on the batteries to be used.

This makes it possible to notify the user operating the power consumption element that the requested power cannot be supplied. That is, the user can recognize that the speed cannot be increased rapidly, even if rapid acceleration is performed, for example.

The charge and discharge control device pertaining to the twelfth invention is the charge and discharge control device pertaining to any of the sixth, ninth, tenth, and eleventh inventions, wherein the second threshold is the discharge lower limit value or the remaining capacity at which the rated power of the batteries can no longer be supplied.

By setting the second threshold value to be the remaining capacity at which the rated power of the batteries can no longer be supplied, it is possible to control so that all of the plurality of batteries can output the rated power for as long as possible.

Also, setting the second threshold value to be the discharge lower limit value reduces deterioration of the batteries.

The charge and discharge control device pertaining to the thirteenth invention is the charge and discharge control device pertaining to the first invention, wherein the power consumption element is an electric motorcycle, an electric bicycle, an electrically assisted bicycle, or a power tool.

Here, a vehicle, including an electric motorcycle and an electric bicycle, is used as the power consumption element.

Consequently, batteries with a low remaining capacity can be efficiently replaced with charged batteries at the station. Also, it is possible to meet the user's power demands based on the opening up the throttle, stepping on the accelerator, or the like.

The power consumption element also encompasses electric power tools such as an electric drill.

The charge and discharge control system pertaining to the fourteenth invention comprises a remaining capacity estimator, a required power input component, and a priority setting component. The remaining capacity estimator estimates the remaining capacity of a plurality of batteries that are removably connected in parallel to a power consumption element. The required power input component inputs a request for power to be supplied to the drive source of the power consumption element. The priority setting component sets the priority of use of the plurality of batteries when supplying the power inputted to the required power input component on the basis of the remaining capacity estimated by the remaining capacity estimator.

This allows the charge and discharge control device to acquire the remaining capacity of each of the plurality of batteries and to control the remaining capacity.

Therefore, the remaining capacity of the batteries can be adjusted to reduce the amount of work entailed by battery replacement at the station, and the user's power demands can be met.

The charge and discharge control method pertaining to the fifteenth invention is a charge and discharge control method for controlling the charging and discharging of a plurality of batteries that can be removably connected in parallel to a power consumption element, said method comprising a required power input step, a remaining capacity acquisition step, and a priority setting step. The required power input step involves being inputted a request for power to be supplied to the drive source of a power consumption. The remaining capacity acquisition step involves acquiring the remaining capacity of each of the batteries. The priority setting step involves setting the priority of use of the plurality of batteries when supplying the power inputted in the required power input step on the basis of the remaining capacity acquired in the remaining capacity acquisition step.

The number of batteries used out of the plurality of batteries will vary with the amount of the power that is requested, but by using specific batteries preferentially, a distribution can be provided in the remaining capacity of the batteries, rather than using them evenly. Specifically, the remaining capacity of batteries used preferentially can be decreased, and the remaining capacity of other batteries increased. Accordingly, just those batteries with a low remaining capacity can be replaced, instead of replacing all the batteries, so the overall remaining capacity of the batteries in a power consumption element can be efficiently increased. Because the overall remaining capacity of the batteries in a power consumption element can thus be increased with fewer replacements, battery exchange entails less work.

Also, when the remaining capacity of batteries used preferentially decreases, other batteries can be used preferentially, which prevents the remaining capacity of the first batteries from dropping to zero or discharge lower limit value. Therefore, even when there is a request for power requiring the maximum output based on the number of batteries, since the rated output can be supplied from all the batteries, the user's power demands can be met.

As described above, it is possible to adjust the remaining capacity of batteries to reduce the work entailed by battery exchange at a station, and the user's power demands can be met.

Effects

With the charge and discharge control device, charge and discharge control system, and charge and discharge control method of the present invention, it is possible to adjust the remaining capacity of batteries to reduce the work entailed by battery replacement and to meet the power demands of the user.

DETAILED DESCRIPTION

The battery system, charge and discharge control device, and charge and discharge control method pertaining to an embodiment of the present invention will now be described through reference to the drawings.

1. Configuration 1-1. Battery System 1

Figure 1:
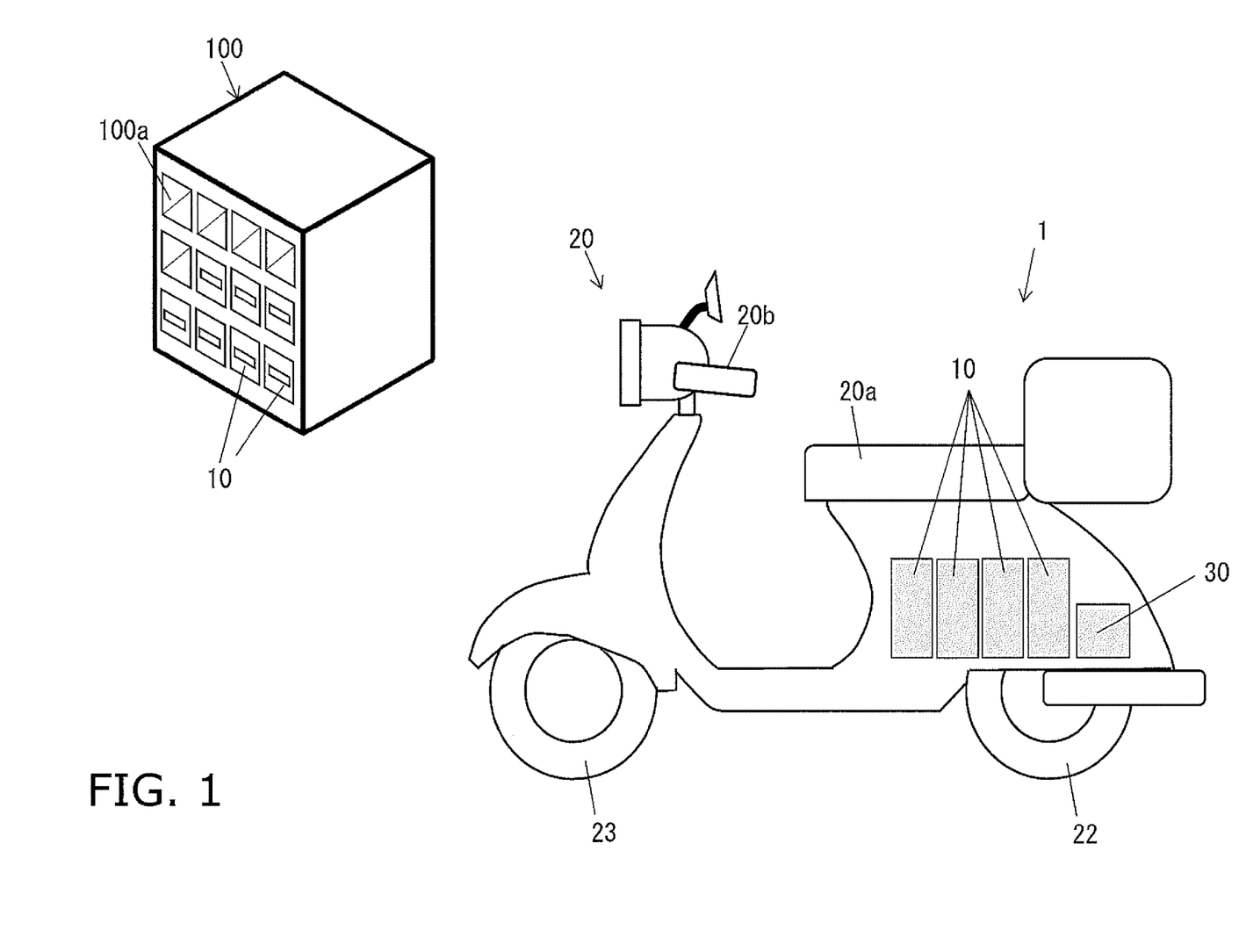
FIG. 1 shows the battery system and a station where battery packs are exchanged in an embodiment of the present invention.

The battery system 1 in this embodiment is a system that supplies power to a vehicle 20, and comprises a battery pack 10 and the vehicle 20, as shown in FIG. 1.

As shown in FIG. 1, four battery packs 10 are installed in the vehicle 20, such as an electric motorcycle.

In the vehicle 20, power is supplied from the four battery packs 10 installed in a space below a seat 20a, and the rear wheel (drive wheel) 22 is rotationally driven so that the vehicle can travel.

The vehicle 20 can make use of what is known as a battery swap, in which the battery packs 10 whose remaining capacity has been reduced by travel, natural discharge, or the like are replaced with charged battery packs 10 at a specific station 100. As shown in FIG. 1, the station 100 has receptacles 100a into which a plurality of batteries packs 10 are inserted. The battery packs 10 are disposed in these receptacles 100a. Stations 100 are set up at a plurality of locations such as gasoline stations.

1-2. Battery Packs 10

In order to supply power to the vehicle 20, in this embodiment four of the battery packs 10 are installed in the vehicle 20 in a manner that allows them to be replaced. Here, when distinguishing among the four battery packs 10, they will be called battery packs 10A, 10B, 10C and 10D.

Figure 2:
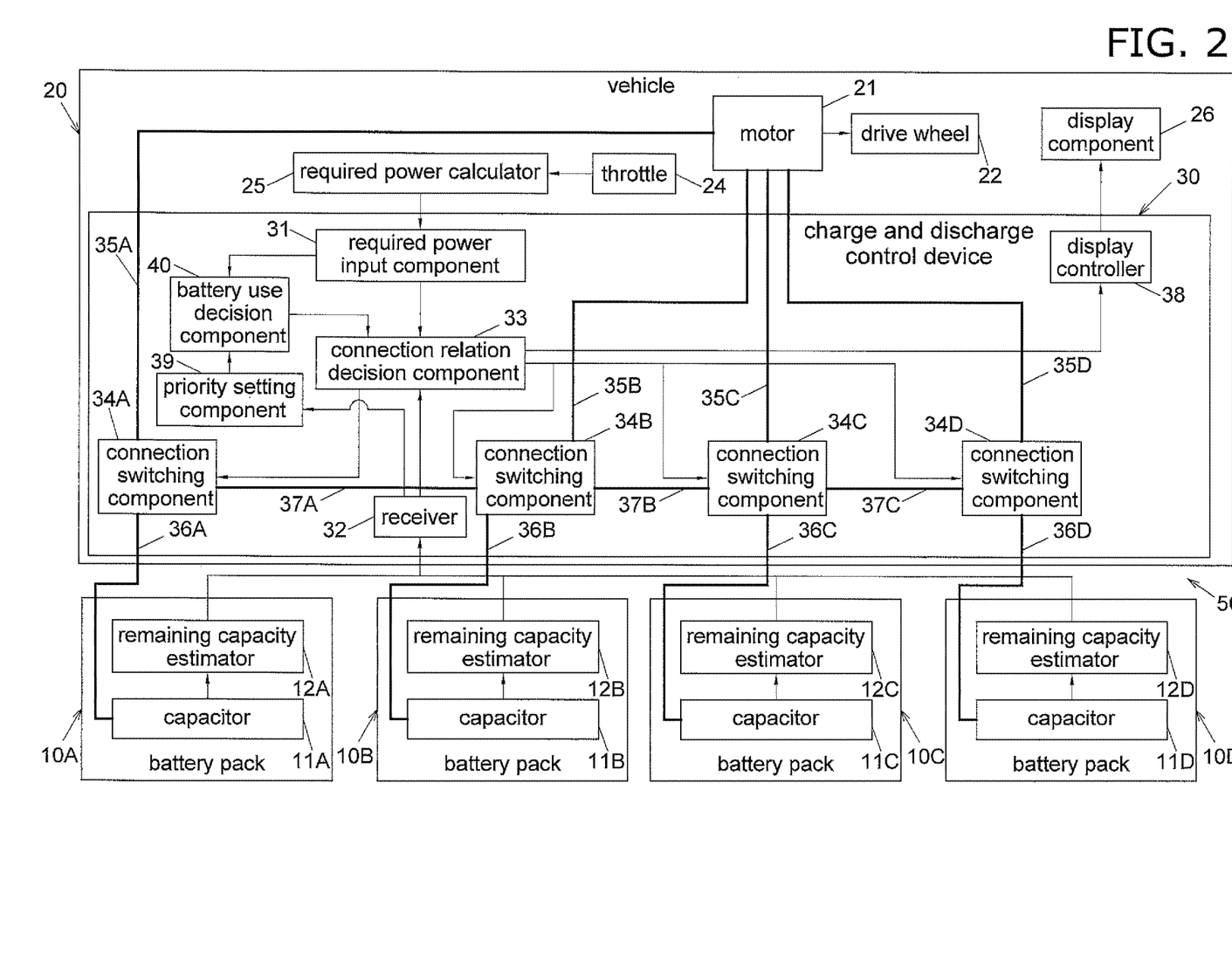
FIG. 2 is a block diagram of the configuration of the battery system in FIG. 1.

As shown in FIG. 2, the four battery packs 10 each have a capacitor 11 and a remaining capacity estimator 12. To distinguish between the four capacitors 11 and the four remaining capacity estimators 12, they will be called the capacitors 11A, 11B, 11C, and 11D, and the remaining capacity estimators 12A, 12B, 12C, and 12D. Specifically, the battery pack 10A has the capacitor 11A and the remaining capacity estimator 12A, the battery pack 10B has the capacitor 11B and the remaining capacity estimator 12B, the battery pack 10C has the capacitor 11C and the remaining capacity estimator 12C, and the battery pack 10D has the capacitor 11D and the remaining capacity estimator 12D.

The capacitors 11A, 11B, 11C, and 11D store or discharge electric power. When the four battery packs 10A, 10B, 10C, 10D are installed in the vehicle 20, the four capacitors 11A, 11B, 11C, 11D are electrically connected in parallel to the vehicle 20. Therefore, even if just one of the four battery packs 10 is installed in the vehicle 20, power can still be supplied to the motor 21, and the vehicle 20 can be ridden.

The remaining capacity estimators 12 estimate the remaining capacity of the capacitors 11 by measuring current or voltage. Specifically, the remaining capacity estimator 12A estimates the remaining capacity of the capacitor 11A, the remaining capacity estimator 12B estimates the remaining capacity of the capacitor 11B, the remaining capacity estimator 12C estimates the remaining capacity of the capacitor 11C, and the remaining capacity estimator 12D estimates the remaining capacity of the capacitor 11D.

The remaining capacity estimators 12A, 12B, 12C, and 12D transmit the estimated remaining capacity of the capacitors 11A, 11B, 11C, and 11D to the vehicle 20.

1-3. Vehicle 20

The vehicle 20 is an electric motorcycle that is propelled when supplied with power from the four battery packs 10 installed under the seat 20a, and as shown in FIG. 2, the vehicle 20 has the motor 21, the rear wheel (drive wheel) 22, a front wheel 23 (see FIG. 1), a throttle 24, a required power calculator 25, a display component 26, and a charge and discharge control device 30.

The throttle 24 is provided on one side of a handle bar 20b, and it is rotated to adjust the speed. The required power calculator 25 has a sensor for sensing how much the throttle is rotated, and calculates a required power value from the measured value.

The charge and discharge control device 30 supplies power from the battery packs 10 to the motor 21 on the basis of the required power calculated by the required power calculator 25.

The motor 21 receives the power supplied from the battery packs 10 and transmits a rotational driving force to the axle of the rear wheel 22, which is the drive wheel.

The front wheel 23 is a steered wheel provided between the front part of the vehicle 20 and the road surface, and the travel direction can be varied by changing the orientation in conjunction with the orientation of the handle bar 20b.

The rear wheel 22 is a drive wheel provided between the road surface and the rear part of the vehicle 20 where the battery packs 10 are installed, and is rotationally driven by the motor 21.

The display component 26 displays output information about the capacitors 11. The display component 26 may also serve as a display component of the speed of the vehicle 20, etc., and may be displayed in a navigation system or may be provided alone.

1-4. Charge and Discharge Control Device 30

The charge and discharge control device 30 controls charging and discharging of the four capacitors 11. The charge and discharge control device 30 has a required power input component 31, a receiver 32, a connection relation decision component 33, connection switching components 34A, 34B, 34C, and 34D, a display controller 38, a priority setting component 39, and a battery use decision component 40.

The required power input component 31 inputs the required power calculated from the rotation of the throttle 24.

The receiver 32 receives and acquires information about the remaining capacity of the battery packs 10A, 10B, 10C, and 10D. More precisely, the receiver 32 acquires the remaining capacity of the capacitors 11A, 11B, 11C, and 11D from the remaining capacity estimators 12A, 12B, 12C, and 12D of the battery packs 10A, 10B, 10C, and 10D, respectively. Communication between the remaining capacity estimators 12A, 12B, 12C, and 12D and the receiver 32 may be by wire or wireless.

The connection switching component 34A switches the electrical connection between the motor 21 and the capacitor 11A on and off. The connection switching component 34B switches the electrical connection between the motor 21 and the capacitor 11B on and off. The connection switching component 34 C switches the electrical connection between the motor 21 and the capacitor 11C on and off. The connection switching component 34D switches the electrical connection between the motor 21 and the capacitor 11D on and off.

The connection switching components 34A, 34B, 34C, and 34D also switch the connection relation between the capacitors 11A, 11B, 11C, and 11D.

More precisely, the motor 21 and the connection switching component 34A are connected by a motor connection wire 35A, and the capacitor 11A and the connection switching component 34A are connected by a battery connection wire 36A. The motor 21 and the connection switching component 34B are connected by a motor connection wire 35B, and the capacitor 11B and the connection switching component 34B are connected by a battery connection wire 36B. The motor 21 and the connection switching component 34C are connected by a motor connection wire 35C, and the capacitor 11C and the connection switching component 34C are connected by a battery connection wire 36C. The motor 21 and the connection switching component 34D are connected by a motor connection wire 35D, and the capacitor 11D and the connection switching component 34D are connected by a battery connection wire 36D.

The connection switching component 34A and the connection switching component 34B are connected by a inter-battery connection wire 37A, the connection switching component 34B and the connection switching component 34C are connected by a inter-battery connection wire 37B, and the connection switching component 34 C and the connection switching component 34D are connected by an inter-battery connection wire 37C.

The connection switching component 34A can make connections as needed between the motor connection wire 35A, the battery connection wire 36A, and the inter-battery connection wire 37A. The connection switching component 34 B can make connections as needed between the motor connection wire 35B, the battery connection wire 36B, the inter-battery connection wire 37A, and the inter-battery connection wire 37B. The connection switching component 34C can make connections as needed between the motor connection wire 35C, the battery connection wire 36C, the inter-battery connection wire 37B, and the inter-battery connection wire 37C. The connection switching component 34D can make connections as needed between the motor connection wire 35D, the battery connection wire 36D, and the inter-battery connection wire 37C.

For example, when charging and discharging are performed between the capacitor 11A and the capacitor 11D, the connection switching component 34A connects the battery connection wire 36A and the inter-battery connection wire 37A, the connection switching component 34B connects the inter-battery connection wire 37A and the inter-battery connection wire 37B, the connection switching component 34C connects the inter-battery connection wire 37B and the inter-battery connection wire 37C, and the connection switching component 34D connects the battery connection wire 36D and the inter-battery connection wire 37C. This allows power to be exchanged between the capacitor 11A and the capacitor 11B. In this case, the connection switching component 34B can connect the motor connection wire 35B and the battery connection wire 36B, and the connection switching component 34C can connect the motor connection wire 35C and the battery connection wire 36C.

As discussed above, the connection switching components 34A, 34B, 34C, and 34D can be controlled to supply power from the capacitors 11A, 11B, 11C, and 11D to the motor 21 and to deliver power between the capacitors 11A, 11B, 11C, and 11D.

The priority setting component 39 sets the priority of the use of the capacitors 11A, 11B, 11C, and 11D (also called the priority order) when supplying power to the motor 21 on the basis of the remaining capacity of each of the capacitors 11A, 11B, 11C, and 11D acquired by the receiver 32.

The battery use decision component 40 decides on the capacitors 11 to be used in supplying power to the motor 21 on the basis of the priority set by the priority setting component 39 and the required power inputted to the required power input component 31. For example, if the priority is in descending order of the capacitors 11A, 11B, 11C, and 11D, then when power needs to be supplied from two capacitors 11 in order to supply the requested power, the battery use decision component 40 chooses the capacitors 11A and 11B as the capacitors 11 to be used.

The connection relation decision component 33 decides on the connection relation between the motor 21 and the capacitors 11A, 11B, 11C, and 11D according to the remaining capacity of the capacitors 11A, 11B, 11C, and 11D received by the receiver 32 and the required power inputted to the required power input component 31, and controls the connection switching components 34A, 34B, 34C, and 34D. How the connection relation is decided will be discussed in further detail below.

The connection switching component 34A, 34B, 34C, and 34D performs switching of the connection relation between the capacitors 11A, 11B, 11C, and 11D.

The display controller 38 causes the display component 26 to display information related to output from the battery packs 10 on the basis of the remaining capacity of the capacitors 11A, 11B, 11C, and 11D acquired via the receiver 32.

The charge and discharge control device 30 and the remaining capacity estimators 12A, 12B, 12C, and 12D in this embodiment correspond to an example of a charge and discharge control system, and are shown in FIG. 2 as a charge and discharge control system 50.

2. Operation

The operation of the battery system 1 in this embodiment will now be described, and an example of the charge and discharge control method of the present invention will also be discussed at the same time.

2-1. Operation Flow of Battery System 1

Figure 3:
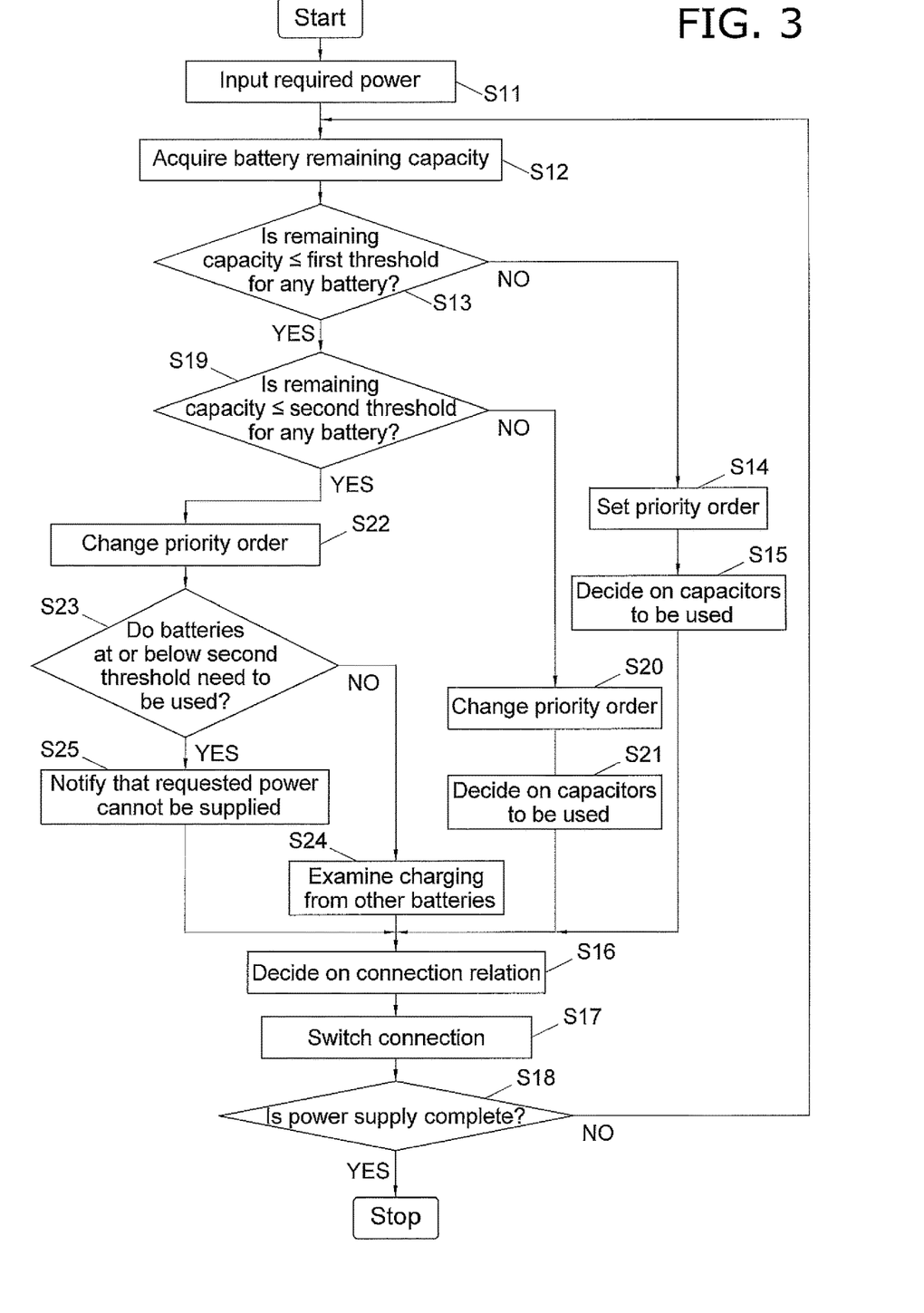
FIG. 3 is a flowchart of the charge and discharge control method in an embodiment pertaining to the present invention.

When the throttle 24 is rotated, the required power calculator 25 calculates a required power value corresponding to the rotation of the throttle 24, and this required power value is inputted to the required power input component 31 (step S11). Step S11 corresponds to an example of the required power input step.

Then, the receiver 32 receives the remaining capacity of the capacitors 11A, 11B, 11C, and 11D estimated by the remaining capacity estimators 12A, 12B, 12C, and 12D (step S12). Step S12 corresponds to an example of a remaining capacity acquisition step.

FIG. 4a is a diagram of the connections between the motor 21 and the capacitors 11A, 11B, 11C, and 11D. In the example shown in FIG. 4a, the full charge capacity of each capacitor 11 is 1.0 kwh, and the rated output is set to 0.5 kw. The charging upper limit value of the capacitors 11 is set to 80% of the full charge capacity, for example, and so is set to 0.8 kwh. The discharge lower limit value of the capacitors 11 is set to 20% of the full charge capacity, for example, and so is set to 0.2 kwh. The charge upper limit value is a value at which the battery tends to deteriorate when charged beyond this value, and the discharge lower limit is a value at which the battery tends to deteriorate when discharged beyond this value. In the example shown in FIG. 4a, the remaining capacity of each of the capacitors 11 is 0.8 kwh.

Then, in step S13, it is determined that the remaining capacity of the capacitors 11A, 11B, 11C, and 11D has reached a first threshold value. Here, the first threshold is above a second threshold (discussed below), and is set to 0.3 kwh, for example. In the example shown in FIG. 4a, none of the capacitors 11 has reached the first threshold value. Therefore, control proceeds to step S14.

Next, in step S14, the priority setting component 39 sets the priority of the capacitors 11 to be used in supplying the required power to the motor 21. In the example shown in FIG. 4a, since the capacitors 11 are all at the same value and none has reached the first threshold value, the priority order is decided to be in the ascending order of the capacitors 11A, 11B, 11C, and 11D, on the basis of the priority of the capacitors 11A, 11B, 11C, and 11D stored in advance in a memory (not shown). For example, let us assume that the priority is decided to be first, second, third, and fourth for the capacitors 11A, 11B, 11C, and 11D, in that order.

Next, in step S15, the battery use decision component 40 decides on the capacitors 11 to be used. In the above-mentioned priority order, when the required power inputted to the required power input component 31 is 1.5 kw, it is decided that the capacitor 11A, the capacitor 11B, and the capacitor 11C will be used.

Next, in step S16, the connection relation decision component 33 decides on the electrical connection relation between the motor 21 and the capacitors 11A, 11B, 11C, and 11D on the basis of the capacitors 11 decided in step S15 to be used. Step S16 corresponds to an example of a connection relation decision step.

In this case, when the required power inputted to the required power input component 31 is 1.5 kw, as shown in FIG. 4b, the switching states of the connection switching components 34A, 34B, 34C, and 34D are decided so that the capacitor 11A, the capacitor 11B, and the capacitor 11C will be connected to the motor 21, and the capacitor 11D will not be connected to the motor 21. When the required power inputted to the required power input 31 is 0.5 kw or less, for example, as shown in FIG. 4(c), the switching states of the connection switching components 34A, 34B, 34C, and 34D are decided so that only the capacitor 11A is connected to the motor 21.

The connection switching components 34A, 34B, 34C, and 34D are controlled and power is supplied to the motor 21 on the basis of the electrical connection relation between the motor 21 and the capacitors 11A, 11B, 11C, and 11D decided by the connection relation decision component 33 (step S17). Step S17 corresponds to an example of a connection switching step.

Power is supplied until the throttle 24 is released and the request for power is stopped, or until the opening degree of the throttle 24 is changed and the requested power changes (step S18).

2-2. When there is a Battery Whose Remaining Capacity is at or Under the First Threshold and at or Above the Second Threshold If the remaining capacity of the capacitors 11 at or under the first threshold chosen in step S13 is not at or under the second threshold (step S19), the control moves to step S20. Then, the priority setting component 39 sets the priority of the four capacitors 11 so as to lower the priority of any capacitors 11 whose remaining capacity is at or under the first threshold and at or above the second threshold.

Then, in step S21, the battery use decision component 40 decides on the capacitors 11 to use in order to supply the requested power, on the basis of the changed priority order.

Next, in step S16, the connection relation decision component 33 decides on the electrical connection relation between the motor 21 and the capacitors 11A, 11B, 11C, and 11D, on the basis of the capacitors 11 decided to be used.

Figure 4:
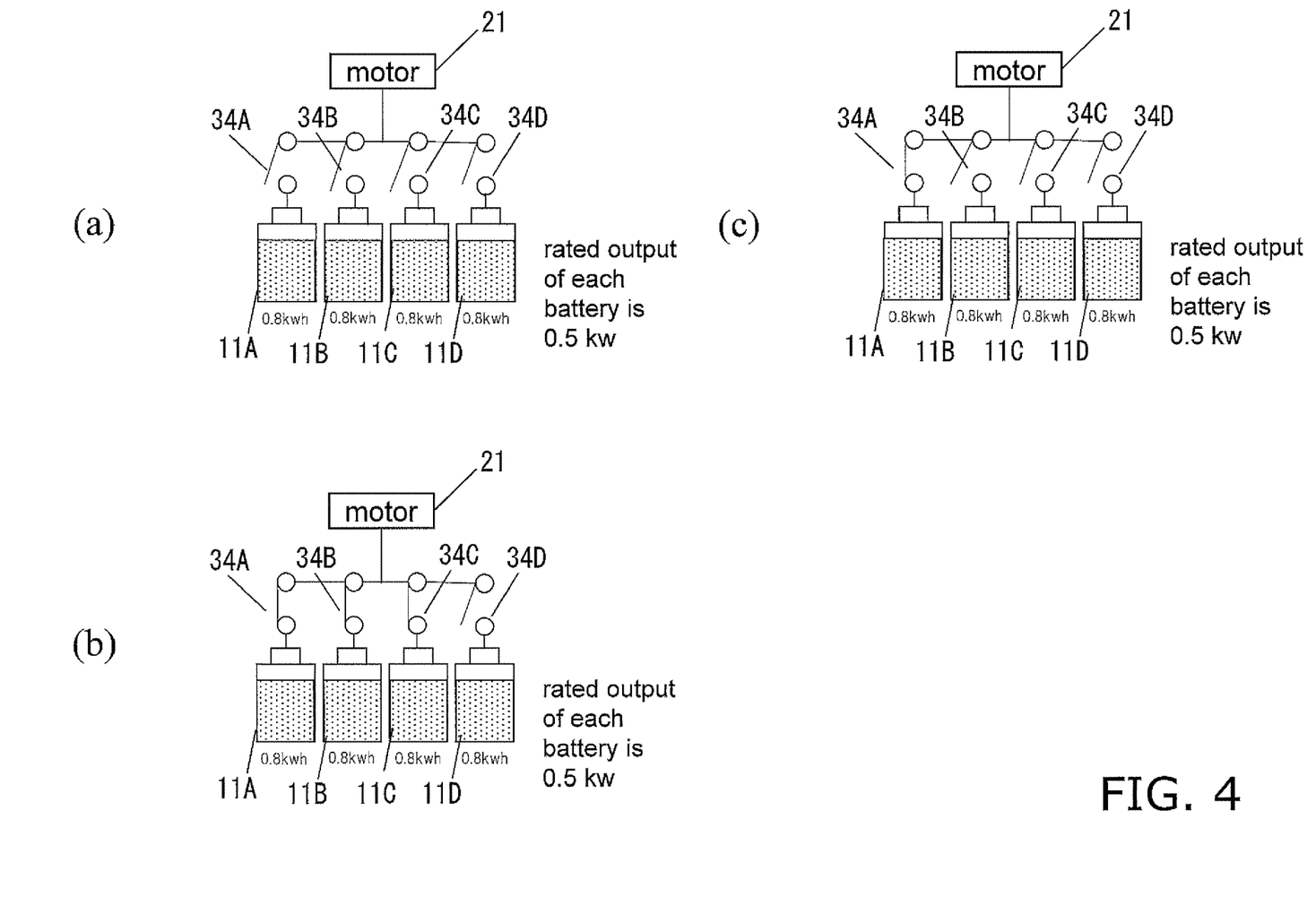
FIGS. 4a, 4b, and 4c are diagrams of the electrical connection relation between the capacitors and the motor in an embodiment of the present invention.

In the example shown in FIG. 4, because the capacitor 11A is used preferentially, the remaining capacity of the capacitor 11A ends up decreasing. For example, as shown in FIG. 5a, let us assume that power is supplied from the capacitors 11A and 11B to the motor 21, and the remaining capacity of the capacitor 11A has reached the first threshold (0.3 kwh).

In step S20, the priority setting component 39 changes the priority of the capacitors 11A, 11B, 11C, and 11D. For example, the priority setting component 39 decides the first, second, third, and fourth priorities to be in the order of the capacitors 11B, 11C, 11D, and 11A. Here, a capacitor 11 whose priority was high the last time preferably still has a high priority when there is a change. That is, the priority is preferably raised in descending order of remaining capacity, except for capacitors 11 that have reached the first threshold value. This is because using the capacitors 11 so that they reach the first threshold in order allows the overall remaining capacity to be efficiently increased, with fewer replacements during battery pack exchange at the station 100.

Then, in step S21 the battery use decision component 40 decides on the capacitors 11 to be used in order to supply the requested power, on the basis of the changed priority. For example, if the power being requested is 1.0 kw, it is decided to use the capacitors 11B and 11C, as shown in FIG. 5b. The connection relation decision component 33 then decides the electrical connection relation so that the capacitors 11B and 11C are electrically connected to the motor 21, power is supplied from the capacitors 11B and 11C to the motor 21, and electrical connection is cut off between the motor 21 and the capacitors 11A and 11D. This means that power will be supplied as little as possible to the motor 21 from a capacitor 11 that has reached the first threshold. If the power that is requested is 0.5 kw or less, the capacitor 11B is used to supply power to the motor 21. If the power that is requested is greater than 1.0 kw, the capacitors 11B, 11C, and 11D are used to supply power to the motor 21. Furthermore, the power that is requested is greater than 1.5 kw, the capacitors 11A, 11B, 11C, and 11D are used to supply power to the motor 21.

Thus, by performing control so as to leave the capacitors 11 as much as possible with a remaining capacity at the first threshold value, even when the opening degree of the throttle 24 is changed and all of the capacitors 11 have to be used, all of the capacitors 11 can output the rated power, so the power request of the user can be met.

2-3. When there is a Battery Whose Remaining Capacity is at or Under the Second Threshold In step S19, if it is presumed that the remaining capacity of the capacitors 11 has reached the second threshold (the discharge lower limit value; 0.2 kwh), in step S22 the priority setting component 39 sets the priority of the capacitors 11 so as to make it impossible to use any capacitors 11 that have reached the second threshold. For example, as shown in FIG. 6a, when the remaining capacity of the capacitor 11A has reached the second threshold, the priority of the other capacitors 11B, 11C, and 11D is set, and the capacitor 11A is unusable. For example, if the first, second, third, and fourth priorities are set in the order of the capacitors 11B, 11C, 11D, and 11A, once the capacitor 11A reaches the second threshold, the first, second, and third priorities are set in the order of the capacitors 11B, 11C, and 11D.

Then, the battery use decision component 40 decides on the capacitors 11 to be used in order to supply the power being requested, on the basis of priority, but in step S23, it is determined whether or not the power being requested cannot be supplied unless those capacitors 11 at or under the second threshold are used.

For example, in the case shown in FIG. 6a, if a power of 1.0 kw is requested when the remaining capacity of the capacitor 11A has reached the second threshold, the requested output can be satisfied by connecting the capacitors 11B and 11C to the motor 21 as shown in FIG. 6a, even though the capacitor 11A is not connected to the motor 21.

In this case, the connection relation decision component 33 determines whether or not capacitors 11 that have reached the second threshold can be charged from other capacitors 11 (step S24). In FIG. 6a, 0.1 kwh is required in order to raise the capacitor 11A from the second threshold value (0.2 kwh) up to at least the first threshold value (0.3 kwh), but it is presumed that charging of 0.1 kwh from other capacitors 11 will be possible. In the example in FIG. 6a, the capacitors 11B and 11C are supplying power to the motor 21, but the capacitor 11D is not supplying power to the motor 21. Furthermore, the remaining capacity of the capacitor 11D is 0.8 kwh, so the first threshold value (0.3 kwh) will not be reached even though 0.1 kwh is supplied to the capacitor 11A.

Therefore, the connection relation decision component 33 determines that a capacitor 11 that has reached the second threshold can be charged from another capacitor 11.

Then, in step S16, in consideration of the power supply to the motor 21 and charging and discharging among the capacitors 11, the connection relation decision component 33 decides on the electrical connection relation between the motor 21 and the capacitors 11A, 11B, 11C, and 11D. More specifically, in the example in FIG. 6b, the connection relation decision component 33 decides to connect the battery connection wire 36A to the inter-battery connection wire 37A, the inter-battery connection wire 37A to the inter-battery connection wire 37B, and the inter-battery connection wire 37B to the inter-battery connection wire 37C, and to connect the inter-battery connection wire 37C to the battery connection wire 36D, and the battery connection wire 36B to the motor connection wire 35B, and the battery connection wire 36C to the motor connection wire 35C as shown in FIG. 2. In deciding these connections, if there is a capacitor 11 whose remaining capacity is at or under the first threshold and is above the second threshold, the priority of that capacitor 11 is lowered.

Thus, power is supplied from the capacitors 11C and 11D to the motor 21 while charging and discharging are performed among the capacitors 11A and 11B. It is presumed in step S13 that the remaining capacity of the capacitor 11A has reached the first threshold, and in steps S14 to S16 the connections are cut off between the battery connection wire 36A and the inter-battery connection wire 37A, between the inter-battery connection wire 37A and the inter-battery connection wire 37B, between the inter-battery connection wire 37B and the inter-battery connection wire 37C, and between the inter-battery connection wire 37C and the battery connection wire 36D, so that no charging or discharging will be performed between the capacitors 11A and B.

On the other hand, in step S23, if the requested power cannot be supplied unless a capacitor 11 that has reached the second threshold is used, the display controller 38 causes the display component 26 to display a notification to the effect that the requested power cannot be supplied (step S25). An example would be a case in which a power of 2.0 kw is requested when the remaining capacity of the capacitor 11A has reached the second threshold, in which case the requested output cannot be satisfied without using the capacitor 11A. Therefore, a notification to the effect that the requested power cannot be supplied is displayed on the display component 26. This notification may be displayed on an LCD screen, or the user may be notified by lighting an LED lamp, for example.

3. Features, etc.

(3-1)

The charge and discharge control device 30 in this embodiment is a charge and discharge control device that controls the charging and discharging of the plurality of capacitors 11 that can be removably connected in parallel to the vehicle 20, and comprises the required power input component 31, the receiver 32, and the priority setting component 39. The required power input component 31 inputs a request for power to be supplied to the motor 21 of the vehicle 20. The receiver 32 acquires the remaining capacity of each of the capacitors 11. The priority setting component 39 sets the priority of use of the plurality of capacitors 11A, 11B, 11C, and 11D in supplying the power inputted to the required power input component 31, on the basis of the remaining capacity acquired by the receiver 32.

The number of capacitors used out of the plurality of capacitors 11 will vary with the amount of the power that is requested, but by preferentially using specific capacitors, a distribution can be provided in the remaining capacity of the capacitors 11, rather than using them evenly. That is, the remaining capacity of capacitors 11 used preferentially (in FIG. 5b, the capacitors 11A and 11B, etc.) can be reduced, and the remaining capacity of the other capacitors 11 (in FIG. 5b, the capacitors 11C and 11D, etc.) can be increased. Therefore, by replacing capacitors 11 with a low remaining capacity 11 (in FIG. 5b, the capacitors 11A and 11B), rather than replacing all the capacitors 11, it is possible to efficiently increase the overall remaining capacity of the capacitors 11 installed in the vehicle 20. For example, in the state in FIG. 5b, the overall remaining capacity can be increased from 2.1 kwh to 3.0 kwh by replacing the battery pack 10A of the capacitor 11A and the battery pack 10B of the capacitor 11B with charged battery packs 10 (0.8 kwh).

Thus, the overall remaining capacity of the battery packs 10 in the power consumption element can be increased, with fewer replacements, so less work will be entailed by battery pack 10 replacement.

Also, when the remaining capacity of capacitors 11 that are used preferentially is reduced (0.3 kwh, for example), other capacitors 11 can be used preferentially to prevent the remaining capacity of the capacitors 11 from reaching the discharge lower limit value. Accordingly, even when power of the maximum output based on the number of capacitors 11 is requested, the rated output can be obtained from all of the capacitors 11, so the user's power demands can be met.

As described above, the remaining capacity of batteries can be adjusted so as to reduce the amount of work entailed by battery exchange at the station 100, and the user's power demands can also be met.

(3-2)

The charge and discharge control device 30 in this embodiment further comprises the battery use decision component 40 and the connection relation decision component 33. The battery use decision component 40 chooses one or more capacitors 11 (in FIGS. 4b and 4c, the capacitor 11A) to be used out of the plurality of capacitors 11, on the basis of the priority set by the priority setting component 39 and the power inputted to the required power input component 31. The connection relation decision component 33 decides on the electrical connection relation between the motor 21 of the vehicle 20 and the plurality of capacitors 11 so that power will be supplied to the motor 21 from the capacitors 11 whose use was decided by the battery use decision component 40.

Thus, setting the electrical connection relation allows specific capacitors 11 to be used preferentially even if the requested power changes.

(3-3)

Figure 5:
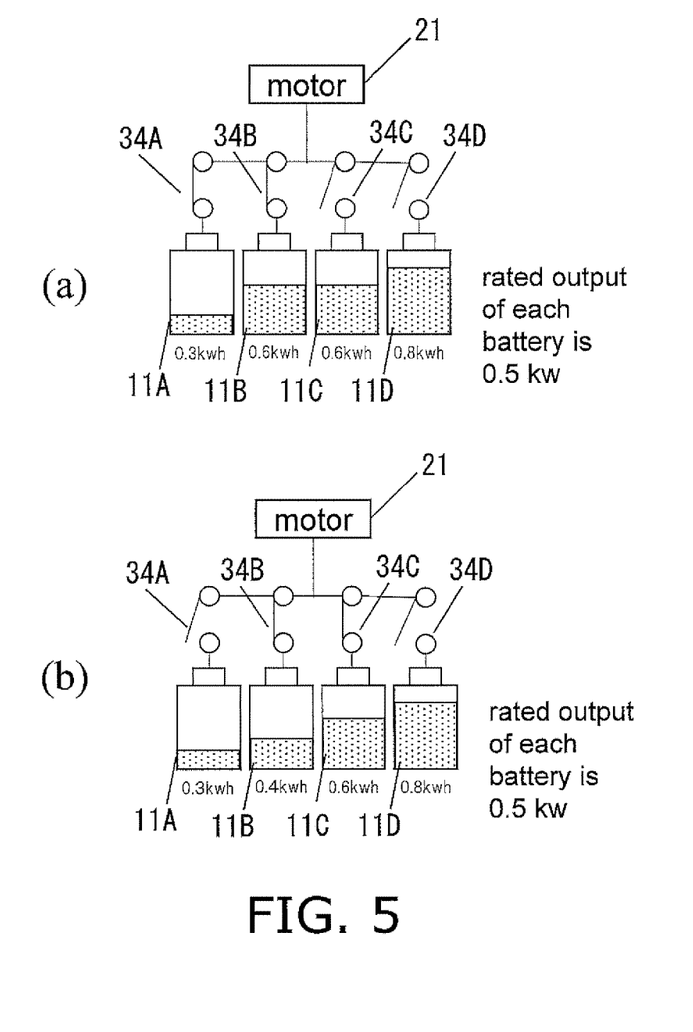
FIG. 5a is a diagram of a state in which the remaining capacity of one of a plurality of capacitors has reached a first threshold value in an embodiment pertaining to the present invention.
FIG. 5b is a diagram illustrating the change in the priority order of a plurality of capacitors in an embodiment pertaining to the present invention.

With the charge and discharge control device 30 in this embodiment, when the remaining capacity of a capacitor 11 with a high priority (in FIG. 5, the capacitor 11A) is presumed to have reached a first threshold (such as 0.3 kwh) on the basis of the remaining capacity acquired by the receiver 32, the priority setting component 39 lowers the priority of that capacitor 11 and raises the priority of the other capacitors 11 (in FIG. 5, the capacitors 11B, 11C, and 11D).

Thus, when the remaining capacity of a capacitor 11 that is preferentially used reaches a first threshold (such as 0.3 kwh), using the other capacitors 11 preferentially allows the remaining capacity of the capacitors 11 to be kept at the first threshold as much as possible. Therefore, even when power of the maximum output based on the number of capacitors 11 is requested, the rated output can be obtained from all of the capacitors 11, so the user's power demands can be met.

(3-4)

With the charge and discharge control device 30 in this embodiment, the priority setting component 39 makes it impossible to use a capacitor 11 (in FIG. 6a, the capacitor 11A) out of the plurality of capacitors 11 whose remaining capacity is at or below the second threshold that is below the first threshold.

This prevents the use of a capacitor 11 whose remaining capacity is at or below the second threshold.

(3-5)

With the charge and discharge control device 30 in this embodiment, the priority setting component 39 sets the priority so that the plurality of capacitors 11 will reach the first threshold (in FIG. 5, for example, 0.3 kwh) one by one, in order, as shown in FIGS. 5a and 5b.

When the system is thus controlled so that the plurality of capacitors 11 reach the first threshold one by one and in order, any capacitors 11 whose remaining capacity has reached the first threshold (in FIG. 5b, the capacitor 11A) or any capacitors 11 whose remaining capacity is close to the first threshold (in FIG. 5b, the capacitor 11B) can be replaced at the station 100, which allows the overall remaining capacity of the capacitors 11 in the vehicle 20 to be increased efficiently.

(3-6)

With the charge and discharge control device 30 in this embodiment, the first threshold is the remaining capacity at which the rated power of the capacitors 11 (such as 0.5 kw) can be supplied.

This allows the rated power to be outputted from capacitors 11 whose remaining capacity has reached the first threshold.

(3-7)

Figure 6:
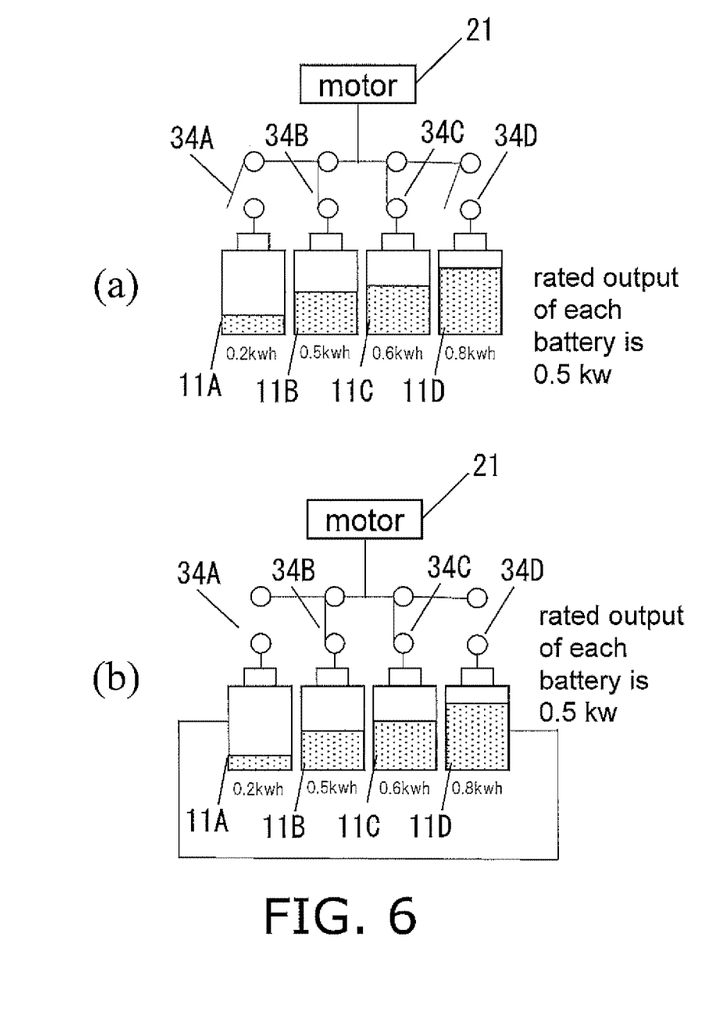
FIG. 6a is a diagram of a state in which the remaining capacity of one of a plurality of capacitors has reached a second threshold value in an embodiment pertaining to the present invention.
FIG. 6b is a diagram illustrating charging and discharging among the capacitors in an embodiment pertaining to the present invention.

With the charge and discharge control device 30 in this embodiment, when the remaining capacity of the capacitors 11 has reached a second threshold (in FIG. 6, 0.2 kwh) that is below the first threshold (such as 0.3 kwh), the connection relation decision component 33 decides on the electrical connection relation so that power will be supplied from other capacitors 11 whose remaining capacity is above the first threshold (in FIG. 6b, the capacitor 11D), to capacitors 11 whose remaining capacity has reached the second threshold (in FIG. 6b, the capacitor 11A).

Thus, when the remaining capacity of a capacitor 11 reaches the second threshold, that capacitor 11 is supplemented with power from the other capacitors 11. The second threshold value can be set, for example, to the discharge lower limit value to prevent deterioration of the capacitors 11.

(3-8)

With the charge and discharge control device 30 in this embodiment, the connection relation decision component 33 decides on the electrical connection relation so that power will be supplied from the other capacitors 11 until the remaining capacity of a capacitor 11 whose remaining capacity has reached the second threshold (in FIG. 6, 0.2 kwh) reaches the first threshold (such as 0.3 kwh).

Thus, when the remaining capacity of a capacitor 11 reaches the second threshold, that capacitor 11 is supplemented with power from other capacitors 11 until its remaining capacity reaches the first threshold. This allows the user's power demands to be met for as long a period of time as possible.

(3-9)

The charge and discharge control device 30 in this embodiment further comprises the display controller 38. The priority setting component 39 makes it impossible to use any of the plurality of capacitors 11 whose remaining capacity is at or below the second threshold (in FIG. 6a, the capacitor 11A) that is below the first threshold. When the battery use decision component 40 decides on which capacitors 11 to use, if the requested power cannot be supplied unless an unusable capacitor 11 is used, the display controller 38 causes the display component 26 of the vehicle 20 to display a notification to the effect that the requested power cannot be supplied.

This allows the user operating the vehicle 20 to be advised that the requested power cannot be supplied. That is, the user can the speed cannot be increased quickly even under heavy acceleration.

(3-10)

With the charge and discharge control device 30 in this embodiment, the vehicle 20 is an electric motorcycles or an electric bicycle.

Here, vehicles including electric motorcycles and electric bicycles can be used as the vehicle 20.

Consequently, at the station 100, battery packs 10 of capacitors 11 whose remaining capacity is low can be efficiently exchanged for charged battery packs 10. Also, it is possible to meet the user's power demands conveyed through opening of the throttle 24, etc.

(3-11)

The charge and discharge control system 50 in this embodiment comprises the remaining capacity estimator 12, the required power input component 31, and the priority setting component 39. The remaining capacity estimator 12 estimates the remaining capacity of capacitors 11 that can be removably connected in parallel to the vehicle 20. The required power input component 31 inputs requests for power to be supplied to the motor 21 of the vehicle 20. The priority setting component 39 sets the priority of use of the plurality of capacitors 11A, 11B, 11C, and 11D when supplying the power inputted to the required power input component 31, on the basis of the remaining capacity acquired by the remaining capacity estimator 12.

Consequently, the charge and discharge control system can acquire the remaining capacity for each of the plurality of capacitors 11, and can control the remaining capacity.

Therefore, the remaining capacity of the capacitors 11 can be adjusted so as to reduce the work entailed by the exchange of battery packs 10 at station 100, and the user's power demands can be met.

(3-12)

The charge and discharge control method in this embodiment is a charge and discharge control method for controlling a plurality of capacitors 11 that can be removably connected in parallel to a vehicle 20, and comprises a step S11 (an example of a required power input step), a step S12 (an example of a remaining capacity acquisition step), and a step S14 (an example of a priority setting step). Step S11 involves being inputted a request to supply power to the motor 21 of the vehicle 20. Step S12 involves acquiring the remaining capacity of each of the capacitors 11. Step S14 involves setting the priority of use of the plurality of capacitors 11 when supplying the power inputted in step S11, on the basis of the remaining capacity estimated in step S12.

The number of capacitors used out of the plurality of capacitors 11 will vary with the amount of the power that is requested, but by preferentially using specific capacitors, a distribution can be provided in the remaining capacity of the capacitors 11, rather than using them evenly. That is, the remaining capacity of capacitors 11 used preferentially can be reduced, and the remaining capacity of the other capacitors 11 can be increased. Therefore, by replacing capacitors 11 with a low remaining capacity, rather than replacing all the capacitors 11, it is possible to efficiently increase the overall remaining capacity of the capacitors 11 installed in the power consumption element. Thus, it is possible to increase the overall remaining capacity of the capacitors 11 in the vehicle 20, with fewer exchanges, so exchange of the battery packs 10 entails less work.

Also, when the remaining capacity of capacitors 11 that are preferentially used is reduced, the remaining capacity of the capacitors 11 can be prevented from reaching the discharge lower limit value by using the other capacitors 11 preferentially. Therefore, even if the maximum output based on the number of capacitors 11 is requested, the rated output can be obtained from all of the capacitors 11, so the user's power demands can be met.

As described above, it is possible to adjust the remaining capacity of the capacitors 11 so as to reduce the work entailed by replacement of the battery packs 10 at the station 100, and the user's power demands can be met.

4. Other Embodiments

An embodiment of the present invention was described above, but the present invention is not limited to or by the above embodiment, and various modifications are possible without departing from the gist of the invention.

(A)

In the above embodiment, the second threshold value was set to the discharge lower limit value, but it is not limited to the discharge lower limit value. For example, if the rated power cannot be outputted before reaching the discharge lower limit value, the second threshold can be set to a lower limit value at which the rated output can be guaranteed, and this ensures the rated output from each of the capacitors 11.

Consequently, control can be performed so that the rated power can be outputted for as long as possible from all of the capacitors 11.

(B)

In the above embodiment, control was performed so that capacitors 11 that had reached the second threshold were charged by other capacitors 11 when possible, but control may instead be performed so that the above control is not performed, and any capacitors 11 that have reached the second threshold are simply not used.

(C)

In the above embodiment, control was performed so that the remaining capacity of the capacitors 11 would be between the charge upper limit value and the discharge lower limit value, but the lower limit value may be set to 0 (zero), the upper limit value to 100 (the full charge capacity), and control performed in between these.

If all the capacitors 11 are at their full charge capacity, then until all of the capacitors 11 reach 0.8 kwh, for example, all of the capacitors 11 may be connected to the motor 21 to evenly reduce the remaining capacity of all of the capacitors 11.

(D)

In the above embodiment, four of the battery packs 10 were provided, but the number is not limited to four, and may be more than four or less than four.

(E)

In the above embodiment, the remaining capacity estimator 12 was provided in the battery pack 10, and the charge and discharge control device 30 acquired the remaining capacity of the capacitors 11 through the receiver 32 (an example of a remaining capacity acquisition component), but the remaining capacity estimator 12 may be provided to the charge and discharge control device 30 rather than to the battery pack 10. In this case, the remaining capacity estimator 12 provided to the charge and discharge control device 30 estimates the remaining capacity of each of the capacitors 11 of a plurality of battery packs 10. Thus, when the remaining capacity estimator 12 is provided to the charge and discharge control device 30, the remaining capacity estimator 12 corresponds to an example of a remaining capacity acquisition component.

(F)

In the above embodiment, the priority setting component 39 decided on the priority of the capacitors 11A, 11B, 11C, and 11D on the basis of the priority order of the capacitors 11 stored in advance in a memory, but this is not the only option.

(F-1)

At the priority setting component 39, the priority of the plurality of capacitors 11 may be set to the order set by the user. The user can preferentially use battery packs 10 that have not been replaced for a long time, for example.

(F-2)

Also, the priority setting component 39 may decide on the priority of the capacitors 11A, 11B, 11C, and 11D on the basis of the remaining capacity of the capacitors 11A, 11B, 11C, and 11D acquired by the receiver 32. For example, those with higher remaining capacity may be used preferentially. Also, for example, those with lower remaining capacity may be used preferentially, or capacitors 11 whose remaining capacity is in the middle may be used preferentially. In any case, control may be performed so as to use up the capacitors 11 with higher priority until the remaining capacity reaches the first threshold.

(F-3)

Also, the priority setting component 39 may decide on the priority of the capacitors 11A, 11B, 11C, and 11D on the basis of the number of uses. For example, capacitors 11 with fewer uses may be used preferentially, in which case the service lives of the battery packs 10 at the station 100 can be evened out. Also capacitors 11 with more uses may be used preferentially, in which case it will be easier to discard old battery packs 10 in the station 10.

(G)

In the above embodiment, an electric motorcycle was described as the power consumption element, for example, but it may be an electric bicycle, an electrically assisted bicycle, an electric unicycle, an electric automobile (EV), a PHV (plug-in hybrid vehicle), or some other such vehicle.

Furthermore, the power consumption element may be a drill or another such electric power tool, for example.

INDUSTRIAL APPLICABILITY

The charge and discharge control device, charge and discharge control system, and charge and discharge control method of the present invention have the effecting of allowing the remaining capacity of batteries to be adjusted to reduce the work entailed by battery exchange, and allowing the user's power demands to be met, and can be widely applied to vehicles that are driven by replaceable batteries.

REFERENCE SIGNS LIST

1 battery system
10, 10A, 10B, 10C, 10D battery pack 11, 11A, 11B, 11C, 11D capacitor (an example of a battery)
12, 12A, 12B, 12C, 12D remaining capacity estimator
20 vehicle (an example of a power consumption element)
20a seat
20b handle bar
21 motor (an example of a drive source)
22 rear wheel
23 front wheel
24 throttle
25 required power calculator
26 display component
30 charge and discharge control device
31 required power input component
32 receiver (an example of a remaining capacity acquisition component)
33 connection relation decision component
34A, 34B, 34C, 34D connection switching component
35A, 35B, 35C, 35D motor connection wire
36A, 36B, 36C, 36D battery connection wire
37A, 37B, 37C inter-battery connection wire
38 display controller
39 priority setting component
40 battery use decision component
50 charge and discharge control system
100 station
100a receptacle
1001 load
1000 battery

The invention claimed is:

1. A charge and discharge control device configured to control charging and discharging of a plurality of batteries configured to be removably connected in parallel to a power consumption element, the charge and discharge control device comprising:
 a required power input component configured to receive a request for power to be supplied to a drive source of the power consumption element;
 a remaining capacity acquisition component configured to acquire a remaining capacity of each of the plurality of batteries;
 a priority setting component configured to set a priority of use of the plurality of batteries, when supplying the power requested via the required power input component, on the basis of the remaining capacities of the plurality of batteries acquired by the remaining capacity acquisition component; and
 a battery use decision component configured to decide on one or more of the plurality of batteries be preferentially used, on the basis of the priority set by the priority setting component and the power requested via the required power input component, such that the remaining capacity of the one or more of the plurality of batteries decided to be preferentially used is reduced and the remaining capacity of the plurality of batteries is distributed unevenly.

2. The charge and discharge control device according to claim 1, further comprising:
 a connection relation decision component configured to decide on an electrical connection relation between the plurality of batteries and the drive source of the power consumption element so as to supply power from the one or more of the plurality of batteries decided to be used by the battery use decision component to the drive source.

3. The charge and discharge control device according to claim 1,
 wherein the priority setting component sets the priority of the plurality of batteries in an order set by a user.

4. The charge and discharge control device according to claim 1,
 wherein the priority setting component sets the priority of the plurality of batteries based on a number of uses of the plurality of batteries.

5. The charge and discharge control device according to claim 1,
 wherein, in response to the remaining capacity of a battery whose priority is high being presumed to have reached a first threshold on the basis of the remaining capacity acquired by the remaining capacity acquisition component, the priority setting component lowers the priority of the battery having the capacity presumed to have reached the first threshold and raises the priority of an other of the plurality of batteries.

6. The charge and discharge control device according to claim 5,
 wherein the priority setting component prevents the use of any of the plurality of batteries whose remaining capacity is at or under a second threshold that is below the first threshold.

7. The charge and discharge control device according to claim 5,
 wherein the priority setting component sets the priority so that the plurality of batteries reach the first threshold one by one and in order.

8. The charge and discharge control device according to claim 5,
 wherein the first threshold comprises a remaining capacity of one of the plurality of batteries at which the one of the plurality of batteries can supply a rated power.

9. The charge and discharge control device according to claim 2,
 wherein, in response to the remaining capacity of a battery whose priority is high being presumed to have reached a first threshold on the basis of the remaining capacity acquired by the remaining capacity acquisition component, the priority setting component lowers the priority of the battery having the capacity presumed to have reached the first threshold and raises the priority of an other of the plurality of batteries, and
 in response to the remaining capacity of one of the plurality of batteries reaching a second threshold that is below the first threshold, the connection relation decision component decides on the electrical connection relation so that power is supplied from an other battery whose remaining capacity is above the first threshold to the battery whose remaining capacity has reached the second threshold.

10. The charge and discharge control device according to claim 9,
 wherein the connection relation decision component decides on the electrical connection relation so that power is supplied from the other battery until the remaining capacity of the battery whose remaining capacity has reached the second threshold reaches the first threshold.

11. The charge and discharge control device according to claim 2, further comprising:
 a display controller;
 wherein, in response to the remaining capacity of a battery whose priority is high being presumed to have reached a first threshold on the basis of the remaining capacity acquired by the remaining capacity acquisition component, the priority setting component lowers the priority of the battery having the capacity presumed to have reached the first threshold and raises the priority of an other of the plurality of batteries, the priority setting component prevents the use of any of the plurality of batteries whose remaining capacity is at or under a second threshold that is below the first threshold, and the display controller is configured to cause a display component of the power consumption element to display a notification that the requested power cannot be supplied in response to the requested power being unable to be supplied without using batteries having capacities below the second threshold, when the battery use decision component decides on the batteries to be used.

12. The charge and discharge control device according to claim 6, wherein the second threshold comprises discharge lower limit value or remaining capacity at which a rated power of one of the plurality of batteries can no longer be supplied.

13. The charge and discharge control device according to claim 1, wherein the power consumption element comprises an electric motorcycle, an electric bicycle, an electrically assisted bicycle, or a power tool.

14. A charge and discharge control system, comprising:

a remaining capacity estimator configured to estimate a remaining capacity of each of a plurality of batteries configured to be removably connected in parallel to a power consumption element;

a required power input component configured to receive a request for power to be supplied to a drive source of the power consumption element;

a priority setting component configured to set a priority of use of the plurality of batteries, when supplying the power requested via the required power input component, on the basis of the remaining capacities of the plurality of batteries estimated by the remaining capacity estimator; and a battery use decision component configured to decide on one or more of the plurality of batteries to be preferentially used, on the basis of the priority set by the priority setting component and the power requested via the required power input component, such that the remaining capacity of the one or more batteries decided to be preferentially used is reduced and the remaining capacity of the plurality of batteries is distributed unevenly.

15. A charge and discharge control method for controlling the charging and discharging of a plurality of batteries configured to be removably connected in parallel to a power consumption element, the charge and discharge control method comprising:

receiving a request for power to be supplied to a drive source of a power consumption;

acquiring a remaining capacity of each of the plurality of batteries;

setting a priority of use of the plurality of batteries, when supplying the requested power, on the basis of the acquired remaining capacities of the plurality of batteries; and deciding on one or more of the plurality of batteries to be preferentially used, on the basis of the set priority and the requested power, such that the remaining capacity of the one or more batteries decided to be preferentially used is reduced and the remaining capacity of the plurality of batteries is distributed unevenly.

* * * * *